United States Patent [19]
Tian et al.

[11] Patent Number: 5,742,446
[45] Date of Patent: Apr. 21, 1998

[54] METHOD FOR DETECTION OF SLIDER-DISK CONTACT

[75] Inventors: Hong Tian, Milpitas; Jia-Kuen Jerry Lee, San Jose, both of Calif.

[73] Assignee: Seagate Technology, Inc., Scotts Valley, Calif.

[21] Appl. No.: 555,241

[22] Filed: Nov. 8, 1995

[51] Int. Cl.$^6$ .............................. G11B 21/02; G01R 33/12
[52] U.S. Cl. .................... 360/75; 360/73.03; 324/212; 324/210; 369/50
[58] Field of Search ................... 360/73.03, 75, 360/77.02, 106, 103; 324/212, 210, 226, 207.26, 207.23, 262; 369/50

[56] References Cited

U.S. PATENT DOCUMENTS 5,410,439  4/1995  Egbert et al. ............................. 360/75
5,545,989  8/1996  Tian et al. ................................ 324/212

Primary Examiner—Aristotelis M. Psitos
Assistant Examiner—Larry T. Cullen
Attorney, Agent, or Firm—Flehr Hohbach Test Albritton & Herbert LLP

[57] ABSTRACT

A method for testing slider/disk contact in a disk drive is described. The disk drive comprises a rotating disk having tracks and a head mounted by an actuator for selective positioning of the head over any one of the tracks of the disk. The head includes a slider. The method comprises the steps of positioning the head at each of a preselected set of tracks, while at each one of the preselected set of tracks, rotating the disk of the disk drive at a preselected rotational velocity and using the head of the disk drive, at each track, to write a signal having a substantially uniform pattern on the disk as it rotates. Thereafter, rotating the disk at a fixed preselected rotational velocity, and while rotating at the fixed preselected rotational velocity, using the head to read back the signals written at each one of the preselected set of tracks. The read back signals are used to determine rotational velocities at which slider/disk contact occurs.

22 Claims, 4 Drawing Sheets

METHOD FOR DETECTION OF SLIDER-DISK CONTACT

FIELD OF THE INVENTION

The present invention is directed to disk drives. More particularly, the present invention provides an efficient and reliable system and method for detecting the take-off velocity for a slider in the disk drive.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surfaces of the disk are divided into a series of data tracks that extend circumferentially around the disk. Each data track can store data in the form of magnetic transitions on the disk surface.

The disk drive further comprises a set of interactive elements, such as magnetic transducers, one per disk surface, that are used to sense the magnetic transitions to read data, or to transmit an electric signal that causes a magnetic transition on a disk surface, to write data. Each magnetic transducer includes a read/write gap that positions the active elements of the transducer at a position suitable for interaction with a magnetic surface of the disk. Typically, each transducer is mounted within a head.

Each head also includes a slider, and mounts the transducer to a rotary actuator arm, via a flexure element arranged between the head and actuator arm to accommodate movement of the head during operation of the drive. The actuator arm operates to selectively position the head, including the transducer and slider, over a preselected data track of the disk to either read data from or write data to the preselected data track of the disk, as the disk rotates below the transducer.

In modern disk drives, the slider is configured to include an air bearing surface that causes the head, and thus the transducer, to fly above the data tracks of the disk surface due to interaction between the air bearing surface of the slider and fluid currents that result from the rotation of the disk. The amount of distance that the transducer flies above the disk surface is referred to as the "fly height." As should be understood, due to operation of the air bearing surface, the transducer does not physically contact the disk surface during normal read and write operation of the disk drive to minimize wear during operation of the drive.

The fly height for a slider refers to the height reached by the slider when the disk is rotating at its operational rotational velocity, i.e. the number of rotations per minute (rpm's) at which the disk drive was designed to operate. The fly height is designed to be at a level sufficient to insure that the transducer is spaced from the disk surface a distance suitable to maintain negligible contact between the head and disk surface during normal disk operation. In any disk drive product, the surfaces of the disks are typically not perfectly smooth and flat. There are peaks and valleys formed on the disk surface. The design fly height should be sufficient, e.g. to generally avoid head/disk contact, despite the passage of disk surface peaks below the head.

When the disk drive is not operating, the rotation of the storage disk is stopped, and the air bearing surface of the head does not act to cause the transducer to fly. Under such circumstances, the head, including the transducer, comes to rest on the disk surface. Typically, the actuator is operated prior to power down of the disk drive, to position the head over a landing zone provided on the disk surface at a location spaced away from any of the data tracks.

In a known contact stop operation of a disk drive, at power down of the drive, the fly height of the head gradually decreases as the rotational velocity slows, until the head comes into contact with the disk surface at the landing zone. The rotational velocity of the disk at which a head first contacts a disk surface is referred to as the "landing" velocity. Thereafter, the head remains in contact with the disk surface until and after rotation of the disk comes to a complete stop. The use of a landing zone prevents any damage to data tracks that may occur due to contact between the head and the disk surface. However, any contact between the head and the disk surface may result in damage to the transducer, and, in any event, contributes to wear of the head and disk surface.

This is also true when the disk drive is started again in a contact start operation. A contact start operation causes the commencement of rotation of the disk while the head is still in contact with the landing zone. The head remains in contact with the disk surface during acceleration of the disk, until the rotational velocity of the disk reaches a "take-off" velocity. The take-off velocity is the rotational velocity of the disk at which the air bearing surface first acts to lift the head from the disk surface such that contact between the slider and the disk surface is negligible. The take-off velocity is approximately equal to the landing velocity.

It is a goal of disk drive manufacturers to limit wear caused by contact between the head and disk surface, particularly during contact stop and start operations, to assure a more reliable mechanical performance of the disk drive. To that end, disk drive designs seek to accomplish disk drive operation wherein a head commences flying operation within an acceptable margin of rotational velocity measured from the operational rotational velocity for the disk.

For example, it has been determined that mechanical performance for a particular drive is likely to be acceptable for a relatively long work life when the head lifts off from and lands on the disk surface at a rotational velocity equal to approximately seventy per cent of the operational rotational velocity of the drive. In general, the fly height of a head is proportional to the rotational velocity of the disk, once the take-off velocity has been reached. In other words, the faster the disk is spinning, the higher the fly height of the head. It has been found that if flying operation (the take-off velocity) for a head is achieved by, e.g., seventy per cent of the operational velocity, the desired fly height should be reached by the head when the disk is accelerated up to the operational velocity. If the take-off velocity is greater than seventy per cent of the operational velocity, there is a significant likelihood that the head does not reach the desired fly height when the disk is accelerated to the operational velocity, leading to excessive wear and premature mechanical failure of the disk drive.

In addition, when the take-off or landing velocity is greater than seventy per cent of the operational velocity, the head remains in contact with the disk surface (i.e. the total sliding distance of the head on the disk surface during either a contact start or stop operation) for a total length of disk surface that is likely to result in excessive wear of the head/disk interface.

During manufacture of disk drives, it is desirable to be able to test each individual disk drive to determine the take-off and/or landing velocity for each head in the drive as a quality control procedure to insure that each head in the disk drive is operating to lift off from or land on the disk surface with a minimal sliding distance, and, in a contact start operation, is operating to reach the design fly height at the operational rotational velocity of the disk.

Co-pending U.S. patent application Ser. No. 08/374,052 entitled FM DETECTION OF SLIDER-DISK INTERFACE was filed on Jan. 19, 1995 in the name of Li-Yan Zhu and assigned to the assignee of the present application. The specification of the aforementioned co-pending application is hereby expressly incorporated by reference. The co-pending application teaches a method for utilizing FM modulation techniques to detect slider/disk contact. The invention disclosed in the co-pending application is based upon knowledge that one of the effects of slider/disk contact is frequency jitter in a signal read back from a disk surface. The invention recognizes that frequency jitter results from many causes, many of which are unrelated to slider/disk contact. Accordingly, the invention of the co-pending application implements a method for detecting take-off velocity by utilizing frequency modulation (FM) and spectrum analysis to detect and analyze frequency jitter specifically caused by slider/disk contact.

Frequency jitter refers to variations in the frequency of the read back signal caused by, e.g., mechanical vibrations resulting from contact between the head slider and disk surface or other mechanical vibrations of the head and actuator. By performing a frequency demodulation of the read back signal and analyzing signal strengths at the various frequencies of the frequency spectrum obtained from the demodulation, information regarding frequency jitter of a type ordinarily caused by slider/disk contact can be ascertained.

When performing the method disclosed in the co-pending application, a determination can be made as to whether each head in the disk drive is achieving fly height within an acceptable margin of the operational rotational velocity for the disks, e.g., whether each head lifts off from and lands on the respective disk surface by the time the disk reaches a rotational velocity equal to approximately seventy per cent of the operational rotational velocity of the drive. The method disclosed in the co-pending application can also be used to determine the actual take-off and landing velocities for a particular head. However, the invention of the co-pending application does not provide an efficient method for determining the actual take-off velocity range for each head in a disk drive in a continuous operation.

SUMMARY OF THE INVENTION

The present invention provides a system and method for accurately and efficiently detecting the actual take-off velocity range for each head in a disk drive product during manufacture of the product. The present invention implements a method for detecting take-off velocity by utilizing the frequency modulation (FM) and spectrum analysis techniques of the co-pending application to detect and analyze frequency jitter specifically caused by slider/disk contact, at specific rotational velocities.

Generally, the present invention provides a method for moving a stack of heads in a disk drive to a number of different track locations. At each track location, the disk drive device under test is operated at a different preselected rotational velocity. The rotational velocities selected correspond to various take-off velocities expected to be encountered by heads installed within the disk drive.

For example, a worst case landing velocity corresponding to the landing velocity of the first head to contact a disk surface in a controlled power down of the disk drive product can be determined in an initial screening test of the disk drive. When the worst case velocity is above a threshold amount, e.g. more than seventy per cent of the operational rotational velocity of the disk drive, the disk drive product is tested further to check each head in the drive. Such a screening test is described in co-pending U.S. application Ser. No. 08/375,087, U.S. Pat. No. 5,545,989, entitled NON-DESTRUCTIVE IN-SITU LANDING VELOCITY DETERMINATION OF MAGNETIC RIGID DISK DRIVES, filed on Jan. 19, 1995 in the names of Hong Tian, Christopher H. W. Briggs, Chisin Chiang and Jia-Kuen J. Lee and assigned to the assignee of the present application. The specification of the aforementioned co-pending application is hereby expressly incorporated by reference.

The rotational velocities selected can begin at the worst case value determined in the initial screening test and increment downwardly, at fixed speed differentials, through a range of, e.g., three or more rotational velocities. After initial screening, disk drives that have an unacceptable worst case take-off velocity can be segregated into groups, each corresponding to a range around a specific worst case velocity value, such that the selected velocities for each group are set as a function of the worst case value of the group.

At each track location, each head of the head stack is operated to write a periodic signal having a preselected frequency onto the specific track. In this manner, a signal is recorded on each of the several tracks at each of several different rotational velocities that may correspond to the take-off velocity for one or more of the heads of the disk drive.

After the writing of the signals on the various tracks, the disk drive is controlled to spin the disks at a preselected rotational velocity that can be, e.g., the operational rotational velocity of the disks. The heads are again positioned over each track, and at each track, the heads are operated to read back the recorded signal. Each read back signal is input to an FM demodulator for frequency demodulation of the read back signal. The output of the FM demodulator is then analyzed, by, e.g., being input to a frequency spectrum analyzer for analysis of signal strengths at frequencies throughout the frequency range demodulated by the FM demodulator.

If peak heights of the frequency signals processed by the spectrum analyzer for a particular read back signal are all below a certain threshold envelope across the frequency spectrum, this will indicate that the slider has lifted the head at both the operational rotational velocity and the velocity selected for the respective track during the write of the signal, since there is no evidence of frequency jitter as would be caused by slider/disk contact.

Accordingly, it will be determined that the particular head in the device under test operates to commence flying operation by at least the selected velocity for the specific track.

If peaks are detected having signal strength values above the threshold envelope, then it will be determined that the head has not lifted from the disk surface by the selected velocity for that track. It is then determined that the take-off velocity for that head is above the rotational velocity for the respective track.

Upon completion of the FM demodulation of all of the read back signals for all of the heads, the present invention provides take-off velocity information for each head at each of the selected rotational velocities. When the selected rotational velocities correspond to a range of rotational velocities related to the worst case take-off velocity, as discussed above, specific actual take-off velocity ranges for the heads of the disk drive device under test are determined.

DETAILED DESCRIPTION

Figure 1:
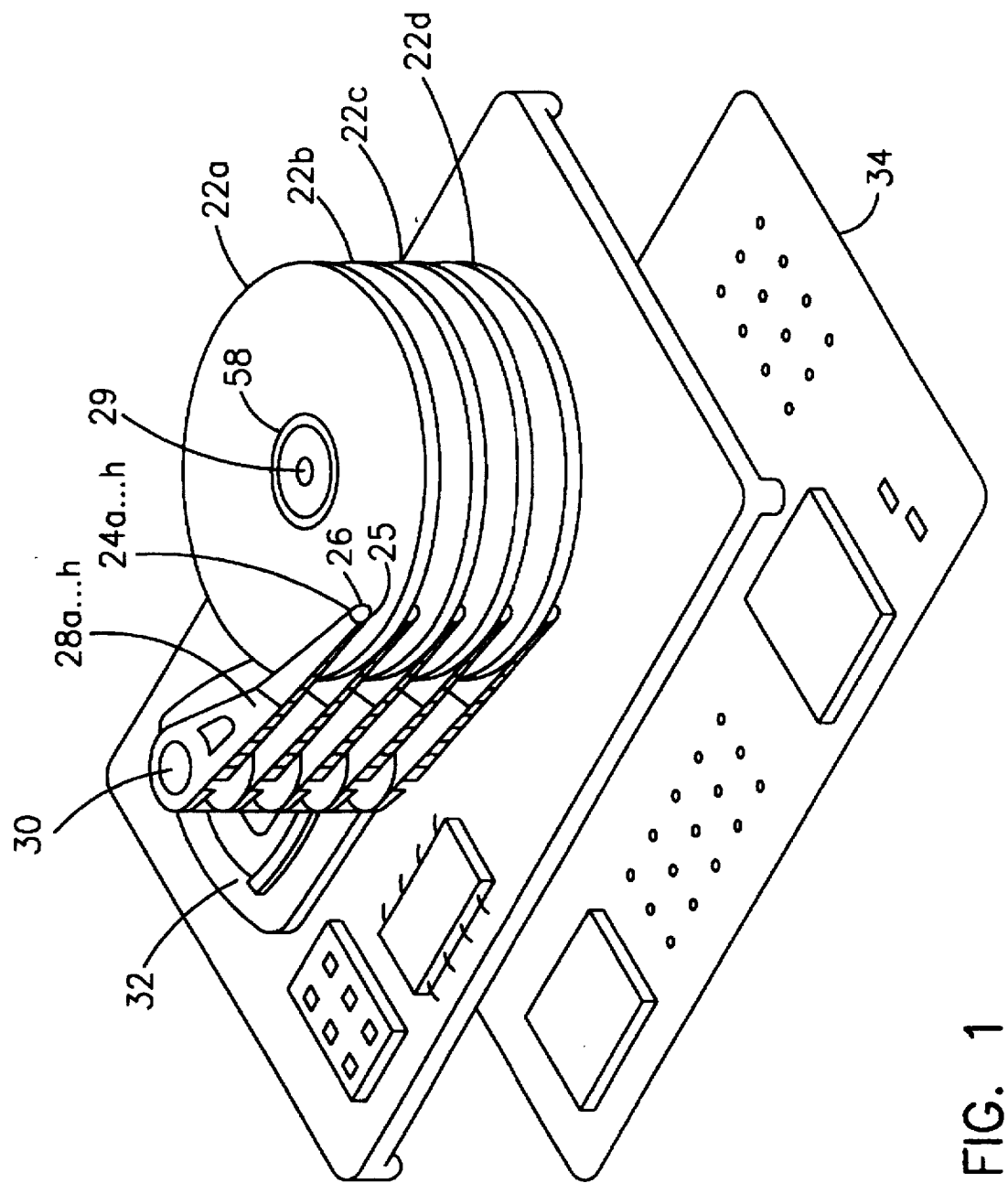
FIG. 1 is perspective view of an exemplary disk drive.

Referring now to the drawings, and initially to FIG. 1, there is illustrated an example of a disk drive designated generally by the reference numeral 20. The disk drive 20 includes a plurality of storage disks 22a–d and a plurality of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented for use in connection with a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h during a contact stop operation, to position the read/write heads 24a–h over a respective landing zone 58, where the read/write heads 24a–h come to rest on the storage disk surfaces. As should be understood, each of the read/write heads 24a–h is at rest on a respective landing zone 58 at the commencement of a contact start operation.

A printed circuit board (PCB) 34 is provided to mount control electronics for controlled operation of the spindle motor 29 and the voice coil motor 32. The PCB 34 also incudes read/write channel circuitry coupled to the read/write heads 24a–h, to control the transfer of data to and from the data tracks of the storage disks 22a–d. The manner for coupling the PCB 34 to the various components of the disk drive is well known in the art.

Figure 2:
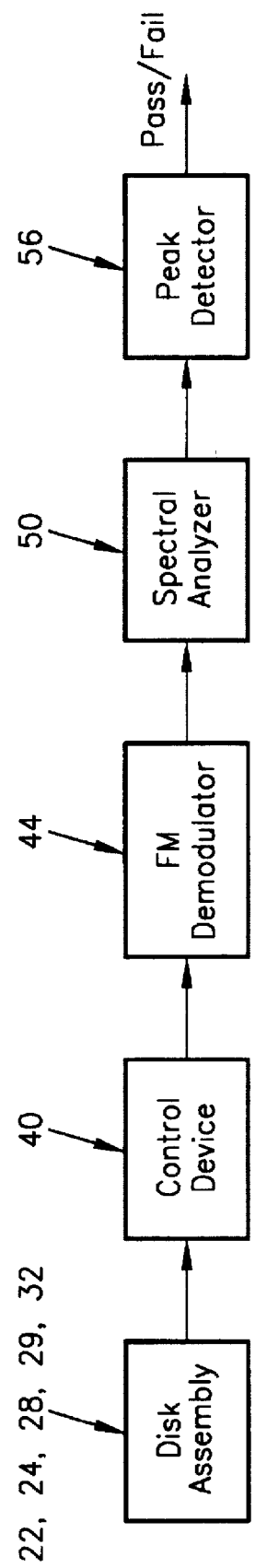
FIG. 2 is a block diagram of a test system according to the present invention.

According to an exemplary take-off velocity test method implementing the present invention, the assembly of actuator arms 28a–h, with heads 24a–h, voice coil motor 32, storage disks 22a–d and spindle motor 29 is coupled to a test system as a device under test, as illustrated in FIG. 2, to determine the take-off velocity of each of the heads 24a–h. A control device 40 simulates the PCB 34 to operate the assembly under test. More particularly, the control device 40 is coupled to the assembly in place of the PCB 34 to control operation of the spindle motor 29 and voice coil motor 32, and includes read/write channel circuitry to cause the heads 24a–h to read or write signals from or to the surfaces of the storage disks 22a–d.

As generally known in the art, the control device is provided with a multiplexer (not shown) to select any one of the heads 24a–h at a time for control to either read or write signals from or to the respective disk surface.

The control device 40 includes an output coupled to an input of an FM demodulator 44. The control device output operates to transmit signals read by a selected one of the read/write heads 24a–h to the FM demodulator 44. The FM demodulator 44 can comprise a conventional FM demodulator, as commonly used in FM radios, modified to receive a frequency bandwidth appropriate to disk drive jitter frequencies, or a laboratory instrument, such as, e.g., an HP 8901A Modulation Analyzer. The FM demodulator 44 includes an output to output signals of various frequencies demodulated from the signal read back by a selected head 24a–h.

A spectrum analyzer 50 includes an input coupled to the output of the FM demodulator 44 to receive the demodulated frequency signals. The spectrum analyzer 50 operates to provide signal strength information for each of the frequencies demodulated by the FM demodulator 44. The spectrum analyzer can comprise a conventional frequency spectrum analyzer or a processor performing a Fourier transformation of the received demodulated frequency signals. For most efficient operation, a fast Fourier transformation algorithm is implemented in the processor, as will be described in more detail below.

An output of the spectrum analyzer 50 is coupled to a peak detector 56 arranged to detect peak values that are above a threshold envelope encompassing a value or values of signal strength indicative of head/disk contact, from the signal strength information generated by the spectrum analyzer 50. The threshold envelope can comprise an RMS value calculated from the demodulated signals. The peak detector 56 operates to output a pass/fail indication for the device under test, based upon detection of peaks above any value encompassed within the threshold envelope, as will appear. Any peak value above a threshold value indicates slider/disk contact.

According to the exemplary test method of the present invention, the control device 40 is operated to cause the voice coil motor 32 to position the actuator arms 28a–h over each of several data tracks of the disks 22a–d, one track at a time. The control device 40 controls the spindle motor 29 to rotate the storage disks 22a–d, at each data track, at a different preselected rotational velocity. In this manner, each head 24a–h is positioned over each of several data tracks, one track at a time, while the disks are rotated at a different velocity at each track.

While rotating at a particular data track, the control device 40 activates each of the heads 24a–h, to write, in turn, a signal having a substantially uniform pattern completely around each respective data track. The wavelength of each pattern signal as written on the respective track, will be a function of the frequency of the signal provided to the head 24 by the control device 40 and the rotational velocity for the specific track location at the time of writing. The written signal will include frequency jitter if the respective activated head 24a–h is in contact with the disk surface during writing of the pattern signal. To advantage, the wavelength of the written signal is set to equal the wavelength of the high frequency signal typically used to test the magnetic performance of the heads 24a–h.

When writing each signal, there will typically be a discontinuity in the signal at the completion of the rotation of the disk. This is due to the fact that the wavelength of the signal does not precisely fit a whole number of cycles within the circumference of the storage disk at the preselected radius. The spectrum analyzer 50 is gated to omit reception of the signal form the head when it is passing over the discontinuity of the signal written on the respective disk surface, as will be described in greater detail below.

After the writing of each signal around each respective data track, the control device 40 controls the spindle motor 29 to rotate the storage disks 22a–d at a rotational velocity that is representative of the operating conditions of the disk drive. For example, the disks are rotated at the operational velocity of the drive. While rotating at the operational velocity, the control device 40 activates each of the heads 24a–h, to read the previously written signals, one at a time. The frequency of each pattern signal as read from the disk surface, will now be a function of operational velocity, and will include frequency jitter if the respective activated head 24a–h was in contact with the disk surface during either reading or writing of the pattern signal.

The sensitivity of frequency of a read back signal is affected by several factors, most notably the magnitude and direction of mechanical vibrations caused by the contact. These factors vary as a function of the particular structures and construction of the mechanical components comprising the head, flexure and other suspension elements mounting the head to an actuator arm. Initially, the sensitivity of read back frequency to head/disk contact can be determined experimentally for a particular head.

According to the exemplary take-off velocity test method of the present invention, each of the signals read back by the heads 24a–h are transmitted by the output of the control device 40 to the input of the FM demodulator 44. The FM demodulator 44 may include output filters to attenuate frequency jitter unrelated to slider/disk contact. The FM demodulator 44 is operated to demodulate the read back signals, one at a time, from the heads 24a–h. The spectrum analyzer 50 is gated at the portion of the signal that contains a discontinuity to omit the influence of the discontinuity in the signal demodulation. The length of the discontinuity is short as compared to frequency jitter effects that may be caused by slider/disk contact. Accordingly, even if slider/disk first occurs at the discontinuity, the effects of jitter will persist beyond the length of the discontinuity, and will be detected by the FM demodulation.

Vibrations of the head/actuator assembly occur in various modes, including flexure modes and suspension modes. The frequency range of the FM demodulation focuses upon vibrations in the flexure mode. It has been determined that flexure vibrations are less susceptible to noise, and more indicative of slider/disk contact. Other forms of vibration, e.g. suspension vibrations, can be caused by factors other than slider/disk contact, such as air turbulence and spindle vibrations. In addition, flexure vibrations occur at a higher frequency than suspension vibrations resulting in higher FM resolution of amplitude information.

Experimentation has shown that flexure modes of vibration are quiet in the absence of slider/disk contact. At the onset of slider/disk contact, one or more flexure modes of vibration increase sharply. The natural vibrations of a flexure occur over a relatively wide frequency bandwidth, which makes it difficult to isolate expected vibrations using band-pass filters. However, the close correlation between flexure modes of vibration and slider/disk contact make flexure vibration modes highly desirable as a basis for determination of slider/disk contact.

Thus, the spectrum analyzer 50 is coupled to the FM demodulator 44 to receive the FM demodulated read back signals, one at a time, and analyze signal amplitudes for each read back signal, over the frequency range corresponding to the natural vibrations that may occur in a flexure due to slider/disk contact. The natural frequencies of flexure vibrations are determined empirically for the type of flexure used in the disk drive 20, and used to set the frequency range for demodulation and spectrum analysis.

Figure 3:
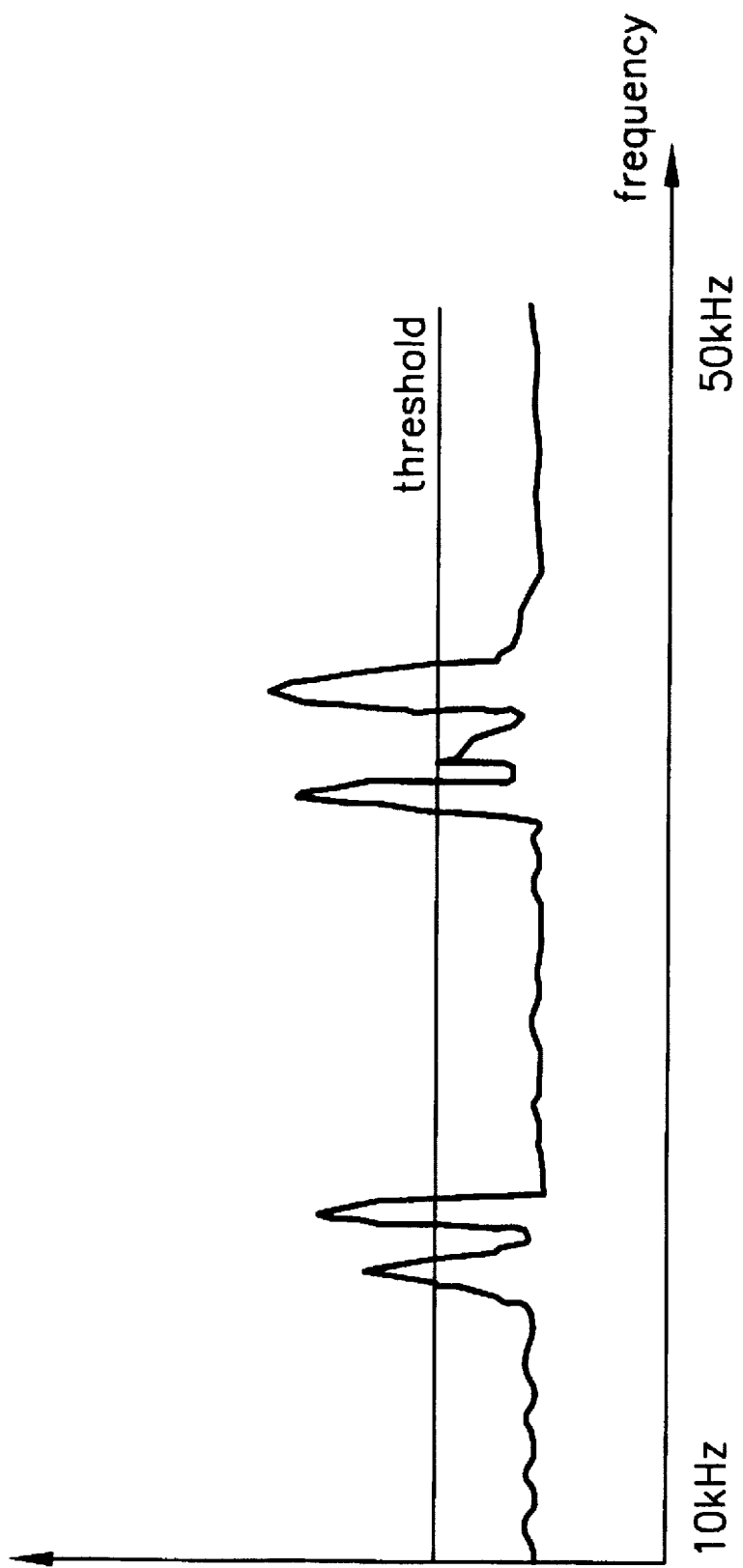
FIG. 3 is a graph illustrating a spectrum of frequencies showing frequency jitter caused by slider/disk contact.

FIG. 3 shows an example of a frequency spectrum, as analyzed by the spectrum analyzer. Throughout a frequency spectrum of from, e.g., 10K hz to 50K hz, there is a low level noise from the FM demodulator 44. A threshold envelope is set at an amplitude or amplitudes that are sufficiently higher than the average level for the noise amplitude to insure that accurate indications of slider/disk contact are obtained. As noted above, the threshold can be calculated as an RMS value of the demodulated signals. The example of FIG. 3 shows a threshold envelope set at a constant value across the frequency spectrum. However, the value of the threshold at any particular frequency can be set at a level appropriate for that frequency.

Whenever slider/disk contact occurs, the amplitude of the various frequencies corresponding to the flexure vibration peak sharply above the threshold. The precise frequencies of vibration varies from drive head to drive head due to manufacturing tolerances and other factors distinctive to a particular head structure. By using a spectrum analysis over a bandwidth that covers the full range of possible flexure vibrations, it is not necessary to know which precise frequencies will correspond to flexure vibration for any particular slider/disk interface.

The spectrum analyzer 50 comprises a processor performing a fast Fourier transformation of the FM demodulated read back signals. A fast Fourier transformation can be performed at much higher speeds than a conventional spectrum analyzer and the results from one revolution of read back are reliable enough for accurately detecting contact. In addition, the discontinuity can be ignored in the analysis.

Each amplitude detected in the spectrum analysis is compared in the peak detector 56 to the threshold value. As noted above, the threshold value at any particular frequency is set relevant to the level of noise in the FM demodulated signals. As shown in the graph of FIG. 3, the amplitude of noise from a conventional FM demodulator is insignificant compared to the amplitude of noise from mechanical vibrations. A conventional FM demodulator of the type typically used in FM radios provides a detection sensitivity of approximately 0.08 μm/s.

If any signal amplitude of any of the read back signals exceeds the threshold value, this indicates flexure vibrations caused by slider/disk contact. The peak detector 56 is operated to indicate which read back signal or signals had signal amplitudes that exceeded the threshold value so that the particular heads 24a–h failing to begin fly height operation by any one of the preselected rotational velocities are identified.

Figure 4:
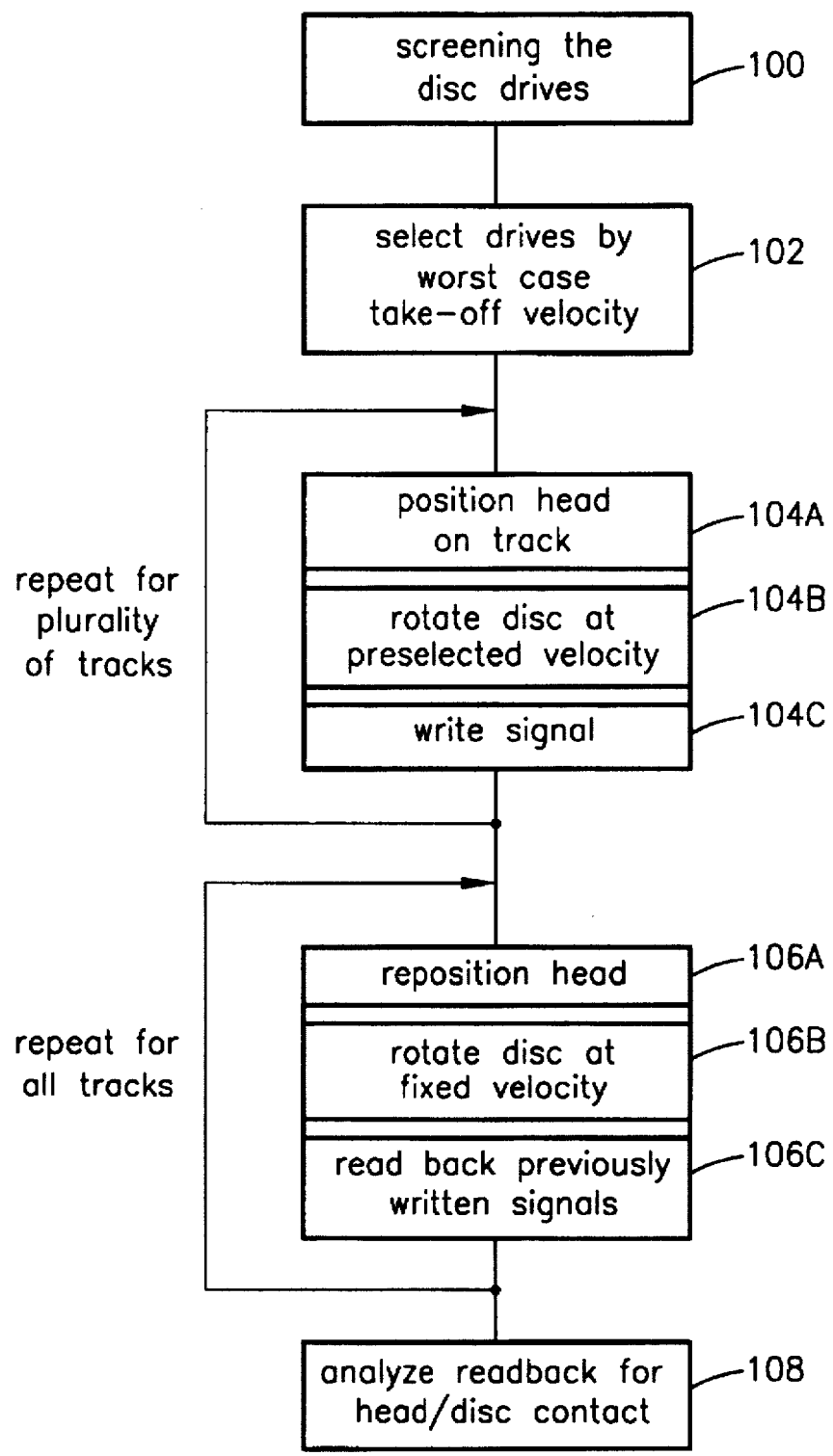
FIG. 4 is a flow chart of a method for testing a set of disc drives to establish which ones have take-off velocities for all heads within certain ranges.

In accordance with another feature of the present invention, outlined in the flow chart of FIG. 4, several test stations can be set up, one for each of a different set of selected rotational velocities. For example, if the disk drive 20 is designed to operate at 7200 rpm, the take-off velocity should equal approximately 70% of 7200 rpm, e.g. 5000 rpm. A screening test of disk drives produced in a mass production facility can be performed in accordance with the invention of co-pending application Ser. No. 08/375,087 to determine an actual worst case take-off velocity for each drive. Those disk drives with a worst case take-off velocity below 5000 rpm pass the screening test since all of the heads of those drives take off by at least seventy per cent of the 7200 rpm operational velocity (step 100).

Tested disk drives with actual take-off velocities of 5000 rpm or above are segregated into bins, one bin for each of several ranges of actual take-off velocity (step 100). For example, those disk drives with an actual worst case take-off velocity of between approximately 5000 to 5200 rpm are placed in one bin, disk drives with an actual worst case take-off velocity of between approximately 5200+ to 5400 rpm are placed in another bin, and so on. The selected rotational velocity set for each bin corresponds to the worst case range of the bin to assure a meaningful test according to the present invention.

Thus, a test signal is recorded by each head of each drive in the first bin, in each of three tracks, with the rotational velocity of the drive set at, e.g., 5200, 5100 and 5000, for the three tracks, respectively (steps 104A, B, C). Following the procedure described above, the head is repositioned over each track and the recorded signal is read back while the disc is rotated at the fixed operational velocity (steps 106A, B, C). In this manner, each head in each drive is tested to ascertain actual take-off velocity ranges for the drive for accurate and efficient repair by using the spectrum analysis described above (step 108). A similar test is run for each of the bins, with appropriate rotational velocities within a range relevant to the actual worst case take-off velocity for the drives segregated into the respective bin.

We claim:

1. A method for testing slider/disk contact in a disk drive comprising a rotating disk having tracks and a head mounted by an actuator for selective positioning of the head over any one of the tracks of the disk, the head having a slider, and a flexure for attaching the head to the actuator, comprising the steps of:

positioning the head at each of a preselected set of tracks;

at each one of the preselected set of tracks, rotating the disk of the disk drive at a track-related preselected rotational velocity wherein the preselected track-related rotational velocity at each one of the preselected set of tracks is different than the preselected rotational velocity at each of the other ones of the preselected set of tracks;

at each one of the preselected set of tracks, using the head of the disk drive to write a signal having a substantially uniform pattern on the disk as it rotates;

thereafter rotating the disk at a fixed preselected rotational velocity;

while rotating at the fixed preselected rotational velocity, using the head to read back the signals written at each one of the preselected set of tracks; and performing an FM demodulation of each of the read back signals through a frequency range corresponding to a range of natural frequencies of vibration of the flexure caused by slider/disk contact.

2. The method of claim 1 wherein the fixed preselected rotational velocity is set at a value that corresponds to an operational rotational velocity of the disk drive.

3. The method of claim 1 wherein each said track-related preselected rotational velocity is within a range set as a function of a worst case take-off velocity of the disk drive.

4. The method of claim 1 comprising the further step of performing a spectrum analysis of the FM demodulation of each read back signal to determine amplitudes of frequency components of the demodulated read back signal caused by slider/disk contact.

5. The method of claim 4 wherein the step of performing a spectrum analysis of the FM demodulation is carried out by performing a Fourier transformation of the FM demodulation.

6. The method of claim 5 wherein the step of performing the Fourier transformation of the FM demodulation is carried out by performing a fast Fourier transformation of the FM demodulation.

7. A method for testing slider/disk contact in a disk drive comprising a rotating disk having tracks and a head mounted by an actuator for selective positioning of the head over any one of the tracks of the disk, the head having a slider, comprising the steps of:

positioning the head at each of a preselected set of tracks;

at each one of the preselected set of tracks, rotating the disk of the disk drive at a track-related preselected rotational velocity wherein the preselected track-related rotational velocity at each one of the preselected set of tracks is different than the preselected rotational velocity at each of the other ones of the preselected set of tracks;

at each one of the preselected set of tracks, using the head of the disk drive to write a signal having a substantially uniform pattern on the disk as it rotates;

thereafter rotating the disk at a fixed preselected rotational velocity;

while rotating at the fixed preselected rotational velocity, using the head to read back the signals written at each one of the preselected set of tracks;

and using the read back signals to determine rotational velocities at which slider/disk contact occurs.

8. The method of claim 7 wherein the fixed preselected rotational velocity is set at a value that corresponds to an operational rotational velocity of the disk drive.

9. The method of claim 8 wherein each said track-related preselected rotational velocity is within a range set as a function of a worst case take-off velocity of the disk drive.

10. The method of claim 9 comprising the further step of, prior to the step of positioning the head at each of a preselected set of tracks, performing a screening test on the disk drive to determine the worst case take-off velocity of the disk drive.

11. A method for testing slider/disk contact in a disk drive comprising a rotating disk having tracks and a head mounted by an actuator for selective positioning of the head over the disk, the head having a slider, comprising the steps of:

positioning the head at each of a preselected set of tracks;

at each one of the preselected set of tracks, rotating the disk of the disk drive at a track-related preselected rotational velocity wherein the track-related preselected rotational velocity at each one of the preselected set of tracks is different than the preselected rotational velocity at each of the other ones of the preselected set of tracks;

at each one of the preselected set of tracks, using the head of the disk drive to write a signal having a substantially uniform pattern on the disk as it rotates;

thereafter rotating the disk at a fixed preselected rotational velocity;

while rotating at the fixed preselected rotational velocity, using the head to read back the signals written at each one of the preselected set of tracks; and performing an FM demodulation of each of the read back signals through a frequency range corresponding to a range of natural frequencies of vibration caused by slider/disk contact; and performing a spectrum analysis of the FM demodulation of each of the read back signals to determine amplitudes of frequency components of the demodulated read back signal caused by slider/disk contact.

12. The method of claim 11 wherein the fixed preselected rotational velocity is set at a value that corresponds to an operational rotational velocity of the disk drive.

13. The method of claim 11 wherein each said track-related preselected rotational velocity is within a range set as a function of a worst case take-off velocity of the disk drive.

14. The method of claim 11 comprising the further steps of:

providing a peak detector arranged to receive the amplitudes; and operating the peak detector to compare the amplitudes to a threshold value relevant to slider/disk contact.

15. The method of claim 14 wherein the threshold is determined as a function of an RMS value of the FM demodulation of each of the read back signals.

16. A method for testing a set of disk drives to determine whether each of the disk drives has an acceptable take-off velocity, each disk drive comprising a rotating disk having tracks and a head mounted by an actuator for selective positioning of the head over any one of the tracks of the disk, the head having a slider, comprising the steps of:

performing a screening test on each one of the disk drives to determine the worst case take-off velocity for each disk drive;

segregating the disk drives by worst case take-off velocity, ranges;

for disk drives in each worst case take-off velocity range;

positioning the head of each disk drive in the range at each of a preselected set of tracks;

at each one of the preselected set of tracks, rotating the disk of the disk drive at a track-related preselected rotational velocity wherein, for each worst case take-off velocity range, the track-related preselected rotational velocity at each one of the preselected set of tracks is different than the preselected rotational velocity at each of the other ones of the preselected set of tracks;

at each one of the preselected set of tracks, using the head of the disk drive to write a signal having a substantially uniform pattern on the disk as it rotates;

thereafter rotating the disk at a fixed preselected rotational velocity;

while rotating at the fixed preselected rotational velocity, using the head to read back the signals written at each one of the preselected set of tracks; and using the read back signals to determine rotational velocities at which slider/disk contact occurs.

17. The method of claim 16 wherein the step of using the read back signals to determine rotational velocities at which slider/disk contact occurs is carried out by performing an FM demodulation of each of the read back signals through a frequency range corresponding to a range of natural frequencies of vibration caused by slider/disk contact.

18. The method of claim 17 comprising the further step of performing a spectrum analysis of the FM demodulation of each of the read back signals to determine amplitudes of frequency components of the demodulated read back signal caused by slider/disk contact.

19. The method of claim 18 comprising the further steps of:

providing a peak detector arranged to receive the amplitudes; and operating the peak detector to compare the amplitudes to a threshold value relevant to slider/disk contact.

20. The method of claim 19 wherein the threshold is determined as a function of an RMS value of the FM demodulation of each of the read back signals.

21. The method of claim 16 wherein the fixed preselected rotational velocity is set at a value that corresponds to an operational rotational velocity of the disk drive.

22. The method of claim 16 wherein each said track-specific preselected rotational velocity is set as a function of the respective worst case take-off velocity range.

* * * * *